Feb. 19, 1952     A. W. FRIEND     2,586,018
HIGH-VOLTAGE POWER SUPPLY
Filed Oct. 31, 1950     2 SHEETS—SHEET 1
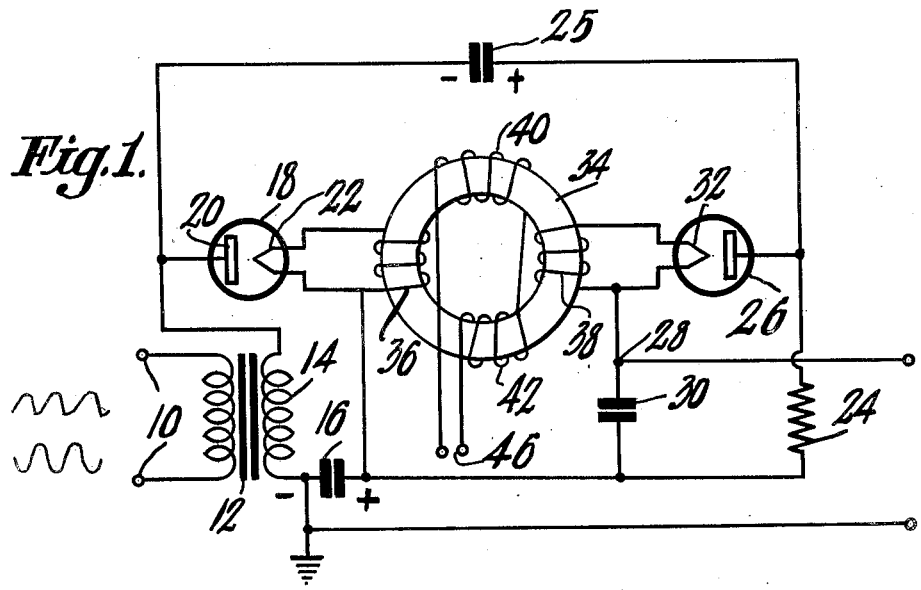
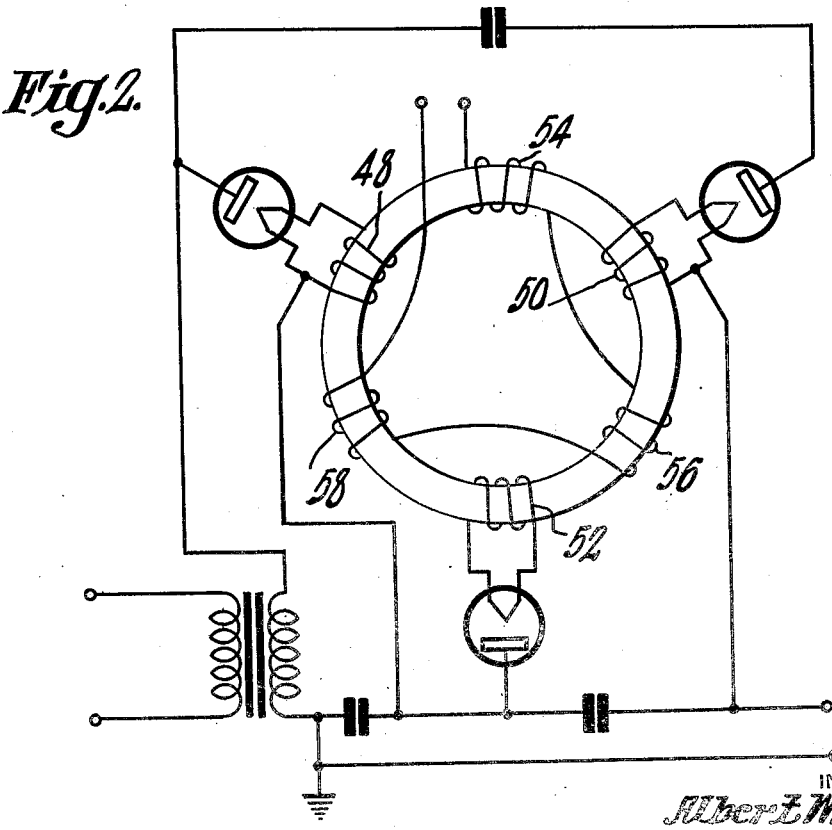
INVENTOR
Albert W. Friend
BY
Olin D. Mitchell
ATTORNEY

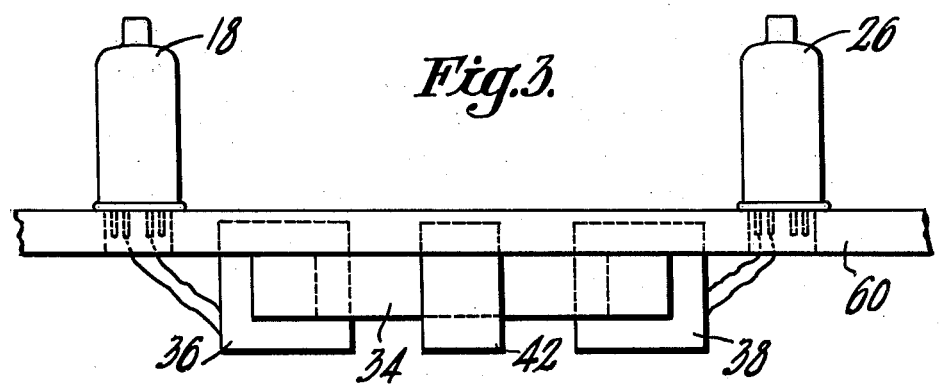
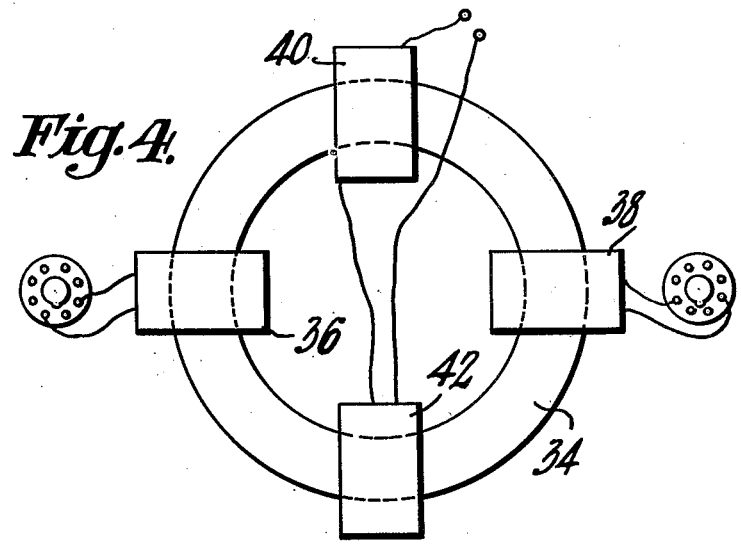
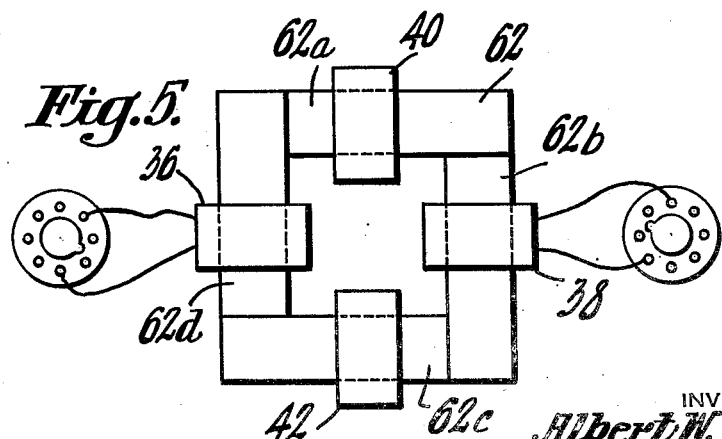

Patented Feb. 19, 1952

2,586,018

UNITED STATES PATENT OFFICE 2,586,018

HIGH-VOLTAGE POWER SUPPLY

Albert W. Friend, Princeton, N. J., assignor to Radio Corporation of America, a corporation of Delaware Application October 31, 1950, Serial No. 193,204

6 Claims. (Cl. 321—15)

1

The present invention relates to electrical circuits and arrangements for producing high unidirectional potentials and more particularly, although not necessarily exclusively, to the physical arrangement of electrical components required in well-known voltage multiplier type power supplies.

With the ever increasing use of cathode ray type tubes in the electronic art there has arisen a very pronounced need for a simple and inexpensive source of high unidirectional potential. Since relatively low currents are demanded for most cathode ray beam accelerating purposes, considerable use is being made of the well known voltage multiplier type alternating current rectifier power supply. Such a power supply is fully described in an article entitled "Pulsed Rectifiers for Television Receivers" by I. G. Maloff appearing in the August, 1947 issue of Electronics. Also in an article entitled "Television High Voltage R-F Supplies" by R. S. Maunter and O. H. Schade in RCA Review for March 1947.

As will be seen from the aforementioned articles, voltage multiplier type power supplies comprise a plurality of rectifier units capacitively coupled in cascade across a source of alternating current which may be either sine wave or pulsed in character. Since in most applications it is desirable to maintain the maximum voltage output for a given number of rectifier stages and since as mentioned above rather low currents are demanded for the acceleration of cathode ray beams it is found desirable to use rather small values of interstage coupling or storage capacitor in the voltage multiplier circuit. Especially where the alternating current voltage source is of high impedance it is desirable to keep the total shunt capacity across the source as low as possible.

As will be seen from the foregoing articles, this interstage storage capacitance for the voltage multiplier circuit may comprise two portions. The first is represented by stray circuit capacitances while the second portion represents actual capacitors connected between the stages. In the case where the rectifier units of the voltage multiplier circuit are of the heater variety it is sometimes difficult to reduce the stray circuit capacitances between successive stages to as low a value as may be optimum for a given operating environment. Moreover the higher the voltage step up provided by the voltage multiplier circuit the greater the potential differential will be between successive heater power supply terminals for the individual rectifier tubes. It is therefore

2 an aim in the design of voltage multiplier circuits of the type under consideration to minimize the stray circuit capacitance between the terminals of adjacent heater power supplies as well as maintain adequate insulation between power supply circuits supplying the heaters of the rectifiers. The insulation problem is particularly aggravated when the heater power supply for individual rectifier tubes constitute separate windings on a single transformer such as, for example, the horizontal output transformer of a television receiver deflection circuit. Another undesirable effect which comes with higher potentials in a voltage multiplier system is the corona discharge loss phenomenon.

It is therefore an object of the present invention to provide a new and useful arrangement for the components of voltage multiplier systems which will substantially reduce the inter-stage capacity and loading capacitance of a voltage multiplier system.

It is another object of the present invention to provide a novel arrangement for operating the stages of a voltage multiplier circuit so as to reduce insulation leakage losses and corona while maintaining a minimum stray circuit capacitance between successive stages of the storage multiplier circuits.

It is a further purpose of the present invention to provide a new and useful arrangement for the elements of a voltage multiplier system with means for supplying power thereto such that optimum stray circuit capacitance effects are obtained while minimizing high voltage corona and leakage losses.

In the realization of the above objects and features of advantage the present invention contemplates the use of a novel heater supply system for the individual rectifier units of a voltage multiplier system. Each rectifier heater is supplied with operating current from a separate secondary winding wound on a closed magnetically permeable loop. Primary windings are then interposed between the various secondary windings on the magnetic loop to induce current variations in the secondary windings. The material comprising the magnetic loop is made, in accordance with the present invention, of a composition which has a high resistivity and high magnetic permeability such as, for example a ferrite of the nickel-zinc-magnesium type. The primary and secondary windings are then positioned around this magnetic loop so as to minimize the capacitance and insulation break down tendencies at the same time further minimizing the possibility of corona discharge.

A more complete understanding of the present invention as well as a realization of other of its objects and features of advantage thereof will be obtained through a reading of the following descriptions especially when considered in connection with the accompanying drawings in which:

Figure 1 illustrates one form of the invention as applied to a voltage doubler type power rectifier circuit, Figure 2 illustrates another embodiment of the present invention as a voltage tripler type power rectifier circuit, Figure 3 illustrates a modification of the embodiment of the present invention shown in Figure 1, Figure 4 is an elevational view of the arrangement shown in Figure 3, Figure 5 illustrates another embodiment of the present invention as applied to the voltage doubler arrangement shown in Figures 1, 3 and 4.

Turning now to Figure 1, there is shown for convenience in describing the present invention a typical voltage doubler type rectifier power supply. The alternating current voltage to be rectified is applied across the terminals 10—10 of the step up transformer 12. Due to the high turns ratio of the transformer 12, the secondary voltage appearing across the secondary 14 attains very high peaks and is applied via capacitor 16 across the diode rectifier 18. When the anode 20 of the diode 18 swings positively with respect to the heater cathode 22, the diode conducts and charges the capacitor 16 with the polarity indicated. During the non-conduction interval of the diode 18 the capacitor 16 will discharge somewhat through the resistor 24 thereby to charge the capacitor 25 with the polarity indicated. Thus the next time the anode 20 swings positively with respect to the cathode 22 the voltage applied to the second diode 26 will be increased over the value applied to diode 18 by the amount of the voltage across capacitor 25. Thus as a practical matter after several successive cycles of operation when the diode 26 conducts the upper terminal 28 of the capacitor 30 will assume a potential with respect to ground which is substantially double the peak voltage appearing across the secondary winding 14 of the transformer 12.

It can therefore be seen that the heater 32 of the diode 26 will assume a potential with respect to ground which is approximately double that of the heater 22 with respect to ground.

Assuming by way of example that the voltage across capacitor 16 was 5000 volts the heater to ground potential of the diode 26 would be approximately 10,000 volts. Aside then from any corona discharge losses that may be encountered in the system due to the high voltages involved it is apparent that in order to avoid additional losses the leakage path between the heaters 22 and 32 must be kept to a minimum. Furthermore since there is in effect a charge sharing action between the capacitor 25 and the capacitor 16 as well as with capacitor 30 the balance of the circuit capacitances involved must be optimum in order to obtain maximum high voltage from the system. Also as has been noted hereinabove, it is sometimes found that the heater to ground capacitance of the rectifier tubes 18 and 26 may, due to the peculiar nature of the power supply system used to excite the heaters, be too high to realize optimum performance.

An example of the difficulties which may be encountered in voltage multiplying circuits of this type due to corona discharge leakage losses and stray circuit capacitances is found in the care with which present day high voltage systems for television receivers must be designed. As is well-known in the television art, it has been common practice in television receivers to generate the required high voltage beam accelerating potential for the cathode ray tube from the "flyback" or return trace pulse appearing across the horizontal deflection yoke system of the receiver. The horizontal deflection output transformer aside from having a high voltage step-up winding in order to increase the potential of this "flyback" pulse, is supplied with low voltage secondary windings designated for the excitation of the high voltage rectifiers used in the voltage multiplying circuit. Due to the conductivity of the ferromagnetic core used in the horizontal deflection output transformer and on account of its necessarily compact design for best performance, considerable corona and leakage losses have to be tolerated. Insulation problems were also quite difficult. Moreover the closeness with which the heater excitation windings of the transformer of necessity have to be associated with the other windings of the transformer and its core produce in many instances very undesirable capacitive effects.

In accordance with the present invention the heater supply system for the rectifiers used in a voltage multiplier circuit comprises a magnetically permeable core 34 around which is wound the filament excitation windings or secondaries 36 and 38. Energy is induced in these windings by means of the primary windings 40 and 42 connected to the alternating current power supply terminals 46. In accordance with the present invention the material of which the core 34 is made is not only magnetically permeable but of high resistivity. This core may be constructed of any ferrite magnetic material which has the electrical properties of an insulator (perhaps $10^7$ ohms or more per centimeter cube) while at the same time possessing a satisfactory magnetic permeability (perhaps 75 or greater relative permeability). Certain ferrites of the nickel-zinc-magnesium type are satisfactory materials for this application. I find purely by way of example that a magnetic ferrite core made from a mix of 0.15 mol of NiO, 0.55 mol of ZnO, 0.30 mol of MgO and 0.90 mol of $Fe_2O_3$, formed and fired in an oxygen atmosphere of 1100° C., is quite satisfactory. The magnetic permeability of this material is approximately 350 and the resistivity $1.10 \times 10^9$ ohms per centimeter cube.

The two equal primary windings 40 and 42 of Figure 1 may be connected in series as shown, or in parallel. Two equal primary windings are used in place of a single winding because it is desired to obtain a maximum coupling to the two secondary windings 36 and 38 and equal induction into each of them. If as shown in Figure 2 three secondary windings such as 48, 50 and 52 are used in a voltage multiplier circuit, the primary windings may be also divided into three sections such as 54, 56 and 58. Any convenient subdivision may be used to obtain the desired results. For example, if there are four secondary windings, they may be grouped in pairs so that only two primary windings may be required. These may be spaced between the pairs of secondaries.

The leakage distance between the coils employed by the present invention is kept from producing excessive losses through the high resistivity of the magnetic core material. This allows a good separation and hence good insulation between the coils.

The arrangement in Figure 2 is as described above substantially the same as that of Figure 1 except that three rectifier units are employed to provide a voltage tripler action. The charging and charge sharing action between the various coupling capacitors of the cascade rectifying arrangement is well known and is substantially the same as described in Figure 1.

The embodiment of the present invention shown in Figure 3 illustrates a convenient way of mounting the core 34 of Figure 1 in proximity to the rectifying units 18 and 26. The core 40 is cemented to an insulating panel or desk 60. The tubes 18 and 26 are adapted for support in close proximity to the coils 36 and 38. This minimizes possible corona losses due to long connecting leads. Figure 4 shows an elevational view of the arrangement in Figure 3. In Figure 5 however, no insulating desk or panel has been shown for purposes of illustrational convenience. The arrangement of Figure 5 is substantially identical to that of Figure 4 with the exception that the core 62 of Figure 5 comprises four sections 62a, 62b, 62c, 62d which may be put together to form a rectangle. The material of each of these sections is of course constituted as described above to give high resistivity and reasonable magnetic permeability. The particular core arrangement of Figure 5 is expedient in that the individual coils 36, 38, 40 and 42 may be formed apart from the core and slipped on the sections 62a, 62b, 62c and 62d before the rectangular core is assembled.

In summarizing the advantages provided by the present invention in the construction of voltage multiplier type power supplies it is found that:

(a) it permits the use of separate filament heating supply windings of quite low distributed capacitance for each diode so that capacitance shunting of the source of high voltage alternating current potential may be minimized, (b) it permits the fabrication and use of a magnetically permeable core material of electrically high resistivity which reduces the capacitance from transformer windings to the core to almost negligible values, (c) it permits the fabrication and use of a magnetically permeable core material which has an extremely high electrical resistivity which reduces the corona discharge and resistive leakage losses from high voltage transformer windings, and (d) it permits the use of a magnetically permeable core material which produces very low energy losses and which may not otherwise be permitted where special wave forms are to be reproduced without distortion.

The combination of the above mentioned advantages permit the construction of voltage rectifier system which may be operated to maximum advantage from sources of pulse or high frequency energy, with high values of peak input voltage and with circuit arrangements utilizing a multiplicity of hot cathode tubes.

Having thus described my invention what I claim is:

1. In a high voltage power supply system the combination of input terminals adapted to receive high voltage alternating current, a plurality of cascaded electron discharge rectifier units connected in voltage multiplying relation to said high voltage terminals, each of said rectifier units having a separate heater element, a structure of comminuted ferrite material conformed to present a closed magnetic loop, the comminuted material having a resistivity of at least $10^7$ ohms per centimeter cubed while having a magnetic permeability of at least 75, a separate take off winding on said closed loop for each rectifier unit heater element, each take off winding being spaced from an adjacent take off winding to provide inter-winding capacitance which is below a predetermined maximum and inter-winding insulation above a predetermined minimum, connections from each take off winding to a respective rectifier heater, a plurality of exciting windings on said closed loop situated between said take off windings and connections from all of said exciting windings to common power supply terminals designated to deliver power for said discharge tube heaters.

2. Apparatus according to claim 1 wherein the ferro-magnetic core material includes approximately .15 mol of NiO, .55 mol of ZnO, .30 mol of MgO and .90 mol of $Fe_2O_3$.

3. Apparatus according to claim 1 wherein the number of exciting windings is equal to the number of said takeoff windings and wherein said exciting and takeoff windings are alternated in space around said closed loop such that the magnetic coupling between any one takeoff winding and its two adjacent exciting windings will be substantially equal to the magnetic coupling between any other take off winding and its two respective adjacent exciting windings.

4. In a high voltage power supply arrangement the combination of voltage input terminals adapted to deliver high alternating current potential, a plurality of unidirectional electron discharge rectifier units having heater elements, capacitive means for interconnecting said rectifier units in voltage multiplying relation to said input terminals such that a high potential differential exists between any two rectifier heater elements, a magnetically permeable structure affording a closed magnetic loop, the magnetically permeable material defining said loop being of a type having high magnetic permeability and high resistivity, a plurality of magnetically coupled but galvanically separate windings spaced around said loop, alternate windings being termed primary coils while the remaining windings are termed secondary coils, alternating current heater power supply terminals designated to receive power for exciting the heaters of said rectifier units, connections from all of said primary coils to said heater power supply terminals for excitation thereby, and separate connections from each of said rectifier heater elements to a different secondary coil.

5. Apparatus according to claim 4 wherein the magnetically permeable material comprises comminuted NiO, ZnO, MgO and $Fe_2O_3$.

6. Apparatus according to claim 5 wherein said magnetically permeable structure is affixed to a structure of insulating material, said sheet being adapted to support said rectifier units at positions immediately adjacent the secondary coil to which each respective rectifier heater is connected.

ALBERT W. FRIEND.

No references cited.